(12) United States Patent
Schwartz et al.

(10) Patent No.: US 6,353,600 B1
(45) Date of Patent: Mar. 5, 2002

(54) DYNAMIC SECTORIZATION IN A CDMA CELLULAR SYSTEM EMPLOYING CENTRALIZED BASE-STATION ARCHITECTURE

(75) Inventors: Adam L. Schwartz, Campbell; Kam-Yin Lau, Danville, both of CA (US)

(73) Assignee: LGC Wireless, Inc., San Jose, CA (US)

(*) Notice: Subject to any disclaimer, the term of this patent is extended or adjusted under 35 U.S.C. 154(b) by 0 days.

(21) Appl. No.: 09/562,598

(22) Filed: Apr. 29, 2000

(51) Int. Cl.[7] .......................... H04Q 7/00; H04B 7/216; H04J 14/02
(52) U.S. Cl. ..................... 370/328; 370/335; 370/535; 359/124; 455/450
(58) Field of Search ................................. 370/203, 320, 370/328, 329, 335, 355, 535, 342, 441, 489; 359/115, 118, 124, 135, 136; 455/450, 452, 561, 562, 560, 442, 518, 519, 517, 509

(56) References Cited

U.S. PATENT DOCUMENTS

| | | | | |
|---|---|---|---|---|
| 4,932,049 A | * | 6/1990 | Lee | 455/562 |
| 5,339,184 A | * | 8/1994 | Tang | 359/124 |
| 5,644,622 A | * | 7/1997 | Russell et al. | 370/328 |
| 5,657,374 A | * | 8/1997 | Russell et al. | 370/328 |
| 5,809,395 A | * | 9/1998 | Hamilton-Piercy et al. | 370/489 |
| 6,178,166 B1 | * | 6/2001 | Wilson et al. | 370/335 |

* cited by examiner

Primary Examiner—Alpus H. Hsu
Assistant Examiner—Afsar M. Qureshi
(74) Attorney, Agent, or Firm—Lumen Intellectual Property Services

(57) ABSTRACT

This invention provides a cellular network architecture in which traffic channel resources are centralized and dynamically allocated to remote cells according to the demand. The present invention provides a method for maximizing capacity resources by dynamically sectorizing cells in a CDMA (Code Division Multiple Access) cellular network. The present invention further provides a CDMA cellular communications network in which centralized traffic channel resources are distributed to remote cells by use of WDM (Wavelength Division Multiplexing) on optical fibers and remote cells are dynamically sectorized according to the traffic demand and the grade-of-service requirement. The primary advantage of the present invention is that it enables a cellular network to dynamically manage and optimally utilize its capacity resources without having to change its hardware design, in contrast to the static and passive nature of the prior art cellular networks. The present invention provides a cost-effective build-out strategy for cellular network operators.

27 Claims, 6 Drawing Sheets

DYNAMIC SECTORIZATION IN A CDMA CELLULAR SYSTEM EMPLOYING CENTRALIZED BASE-STATION ARCHITECTURE

FIELD OF THE INVENTION

This invention relates generally to cellular communications systems. More particularly, it relates to systems and methods for dynamically allocating centralized capacity resources to remote cells in a CDMA cellular network.

BACKGROUND ART

As cellular communications rapidly spread into every walk of modern life, there is a growing demand for ever greater service at ever lower cost.

Conventional cellular networks employ an architecture which divides a geographical area into coverage areas called cells, and a base-station is placed at the center of each cell to serve the cellular traffic. The base-station is equipped with transmitters and receivers that provide the RF radio coverage, while a fixed number of radio channels in the base-station determines the traffic handling capacity. Since each cell must be provided with an adequate number of radio channels in order to meet the peak traffic demand with a specified grade-of-service, the cost for providing such peak traffic capacity and the associated operational expenses must be paid at the outset, though the peak traffic capacity may not be fully utilized most of the time. The situation is further compounded by the non-uniform and dynamic nature of the traffic capacity demand within the cellular network, resulting in capacity shortages in some of the cells while capacity excesses others experience. Moreover, as the demand for cellular service increases within a particular area, the network must be re-engineered and more base-stations must be installed to meet the demand, which can be costly and time consuming. All in all, the dynamic nature of traffic capacity demand makes it difficult for the current cellular networks to operate efficiently and to optimize both cost and grade-of-service.

U.S. co-pending patent applications, "Adaptive Capacity Management in a Centralized Base-station Architecture" of Adam Schwartz Ser. No. 09/560,656 filed on Apr. 27, 2000, and "A Cellular Communications System With Centralized Capacity Resources Using DWDM Fiber Optic Backbone" of Woon Wong and Adam Schwartz 09/561,372 filed on Apr. 28, 2000, provide a novel cellular network architecture that de-couples the traffic capacity and the RF coverage in a cellular network by placing base-stations at a centralized location, in contrast to one base-station per cell structures in prior art networks. The RF coverage in each remote cell is independently provided by one or more RF antennae placed inside the cell. Such a centralized base-station architecture enables the cellular network to dynamically allocate traffic channels to remote cells based upon traffic demand and grade-of-service requirement in each cell, thereby enhancing overall capacity in the network. More specifically, 09/560,656 provides an adaptive capacity management method for cellular communications systems in which radio resources utilize non-interfering channels, such as frequency bands in Frequency Division Multiple Access (FDMA), or time-slot assignments in Time Division Multiple Access (TDMA). 09/561,372 provides a cellular network in which optical fibers and Dense Wavelength Division Multiplexing (DWDM) are advantageously employed to distribute multiple traffic channel groups from the centralized base-stations to different remote cells. The present invention addresses cellular communications systems in which radio resources employ wide-band Code Division Multiple Access (CDMA) channels.

In a CDMA cellular system, the basic unit of radio resource is a set of orthogonal digital codes whose frequency spectrum is spread over a given band of frequency by a pseudo-noise (PN) digital sequence (a spreading code). More than one PN sequence are used to spread the digital codes in a given frequency band. Each digital code spread by a PN sequence is referred to as a CDMA channel, hereinafter. A traffic channel group consisting of one or more CDMA channels characterized by the same PN code occupying the same frequency band is referred to as a CDMA signal, hereinafter. In CDMA technology, PN codes are used for a variety of purposes. The use of PN codes in this invention refers solely to the spreading code used to spread downlink CDMA signals for the purpose of distinguishing downlink CDMA signals of the same frequency band from one another. While CDMA channels within each CDMA signal are orthogonal to each other, CDMA channels belonging to different CDMA signals are not orthogonal to each other. Therefore, when CDMA channels belonging to different PN sequences (i.e., different CDMA signals) are used simultaneously in a cell, cross-interference will occur amongst CDMA channels, which degrades the signal-to-noise ratio of channel reception and leads to undesirable soft-handoff.

Hence, while there is no inherent limit to the number of non-interfering FDMA or TDMA channels that can be shuffled to a given cell, so long as the frequency spectrum and other physical constraints permit, there is an upper limit to the number of CDMA channels sharing a common frequency band that can be allocated to a cell. That is to say that in the current state of CDMA cellular communications, the number of users that can be supported in a cell is limited by the cross-interference amongst CDMA channels, rather than by the amount of traffic channel resources that can be devoted to it.

Sectorization has been implemented in the art to mitigate the cross-interference amongst CDMA channels as described above. That is, multiple directional antennae are used to divide a cell into multiple sectors with mutually exclusive radio coverage areas, such that different CDMA signals allocated to the cell are assigned to different antennae. However, the allotment of traffic channel resources to each sector in the prior art cellular networks has been on a fixed basis, with no provision for dynamic assignment of traffic channels based upon traffic demand and grade-of-service requirement.

What is needed in the art are therefore cellular communications systems in which traffic capacity resources are dynamically managed and optimally utilized.

OBJECTS AND ADVANTAGES

Accordingly it is a principal object of the present invention to provide a cellular network architecture in which traffic channel resources are centralized and dynamically allocated to remote cells according to the demand. It is another object of the present invention to provide a method for maximizing capacity resources by dynamically sectorizing cells in a CDMA cellular network. It is a further object of the present invention to provide a cellular communications network in which centralized traffic channel resources are distributed to remote cells by use of Wavelength Division Multiplexing (WDM) on optical fibers and remote cells are dynamically sectorized according to traffic demand and grade-of-service requirement.

The primary advantage of the present invention is that it enables a CDMA cellular network to dynamically manage and optimally utilize its capacity resources without having to change its hardware design, in contrast to the static and passive nature of the prior art cellular networks. The present invention provides a cost-effective buildout strategy for cellular network operators. Another advantage of the present invention is that as the demand for cellular service increases in a particular area, more capacity can be easily implemented without disrupting the overall operation of the entire network. A further advantage of the present invention is that the use of optical fibers and WDM provides a simple, efficient, and economical way to transmit traffic channel resources between centralized base-stations and remote cells.

These and other objects and advantages will become apparent from the following description and accompanying drawings.

SUMMARY OF THE INVENTION

The present invention provides a cellular network, including a centralized base-station site containing a plurality of base-station units, one or more remote cells, each equipped with S directional antennae, a cellular distribution means for transmitting traffic channel resources between the centralized base-station site and the remote cells, and a management system for supervising traffic channel allocation within the network.

In the cellular network of the present invention, the base-station site is placed at a location that may or may not physically overlap with any of the cell sites. The key feature is that base-station units are clustered together, as opposed to one base-station per cell structures in prior art cellular networks. Each base-station unit handles one or more CDMA signals each containing n CDMA channels at a given frequency band. The S antennae in each remote cell, typically but not necessarily of directional radiation patterns, covers approximately equal and non-overlapping sections of the cell. The cellular-distribution means can be one or more optical fibers along with corresponding units for making the conversion between cellular signals and optical signals, and for multiplexing/de-multiplexing optical signals to the optical fibers. The management system is in communication with the centralized base-station site and capable of measuring offered traffic in each cell, defined as the time-averaged number of simultaneous on-going calls taking place in that cell.

In the initial buildout of the cellular network when traffic is relatively light, one CDMA signal containing n CDMA channels is assigned to all S directional antennae in each remote cell. The management system monitors the offered traffic in each of the remote cells within the entire network and inputs the measured offered traffic to an optimization algorithm. As the traffic grows, the offered traffic m in a given cell may approach the maximum number of simultaneous call which the CDMA signal can support, which generally is less than n due to interference arising from, among other things, non-perfect isolation between different cells and cell sectors. The management system executes the optimization algorithm to determine the number of CDMA signals to be assigned to each cell, and through allocation of different CDMA signals to different antennae with a cell, sectorizes those cells that are assigned with more than one CDMA signal. The sectorization is physically accomplished through the use of antennae that provides mutually exclusive coverage areas in each cell, such that each antenna is assigned no more than one CDMA signal and each sector is served by one CDMA signal. For instance, if three CDMA signals are allocated to a cell where there are three directional antennae with non-overlapping radio coverage areas, each directional antenna is assigned one CDMA signal, and the cell is divided into three sectors. This assignment of distinct CDMA signals to different directional antennae provides more traffic channel capacity to the cell, while mitigating the cross-interference among different CDMA signals.

Various optimization algorithms can be implemented in the management system described above. One exemplary optimization algorithm works essentially as follows. The algorithm assigns to each remote cell a fraction of the total number of CDMA signals available at the base-station site, where the fraction is taken to be approximately equal to the ratio of the offered traffic in a remote cell to the total offered traffic in all remote cells, subject to the constraints that (a) the number of CDMA signals assigned to each remote cell does not exceed S, the maximum number of sectors into which a remote cell can be sectorized, and (b) each remote cell is assigned at least one CDMA signal.

It should be noted that many other optimization algorithms with different optimization constraints and performance metric can also be implemented for the purpose of the present invention. A skilled artisan can devise a suitable optimization algorithm for a given application.

It should be pointed out that sectorization has been employed in cellular communications networks, in both FDMA and TDMA systems primarily for interference reduction and in CDMA systems for capacity enhancement. Such systems commonly use multiple directional antennae to divide a cell into multiple sectors. In contrast to the prior art sectorization mechanism where the allotment of traffic channel groups to different sectors in a cell is on a fixed basis, the present invention makes all traffic channel resources in a cellular network available to all cells and can dynamically sectorize, and further de-sectorize, a cell according to the traffic demand, thus enabling the network to maximize its capacity and operate more efficiently.

The novel features of this invention, as well as the invention itself, will be best understood from the following drawings and detailed description.

DETAILED DESCRIPTION

Although the following detailed description contains many specific details for the purposes of illustration, anyone of ordinary skill in the art will appreciate that many variations and alterations to the following details are within the scope of the invention. Accordingly, the exemplary embodiment of the invention described below is set forth without any loss of generality to, and without imposing limitations upon, the claimed invention.

Figure 1:
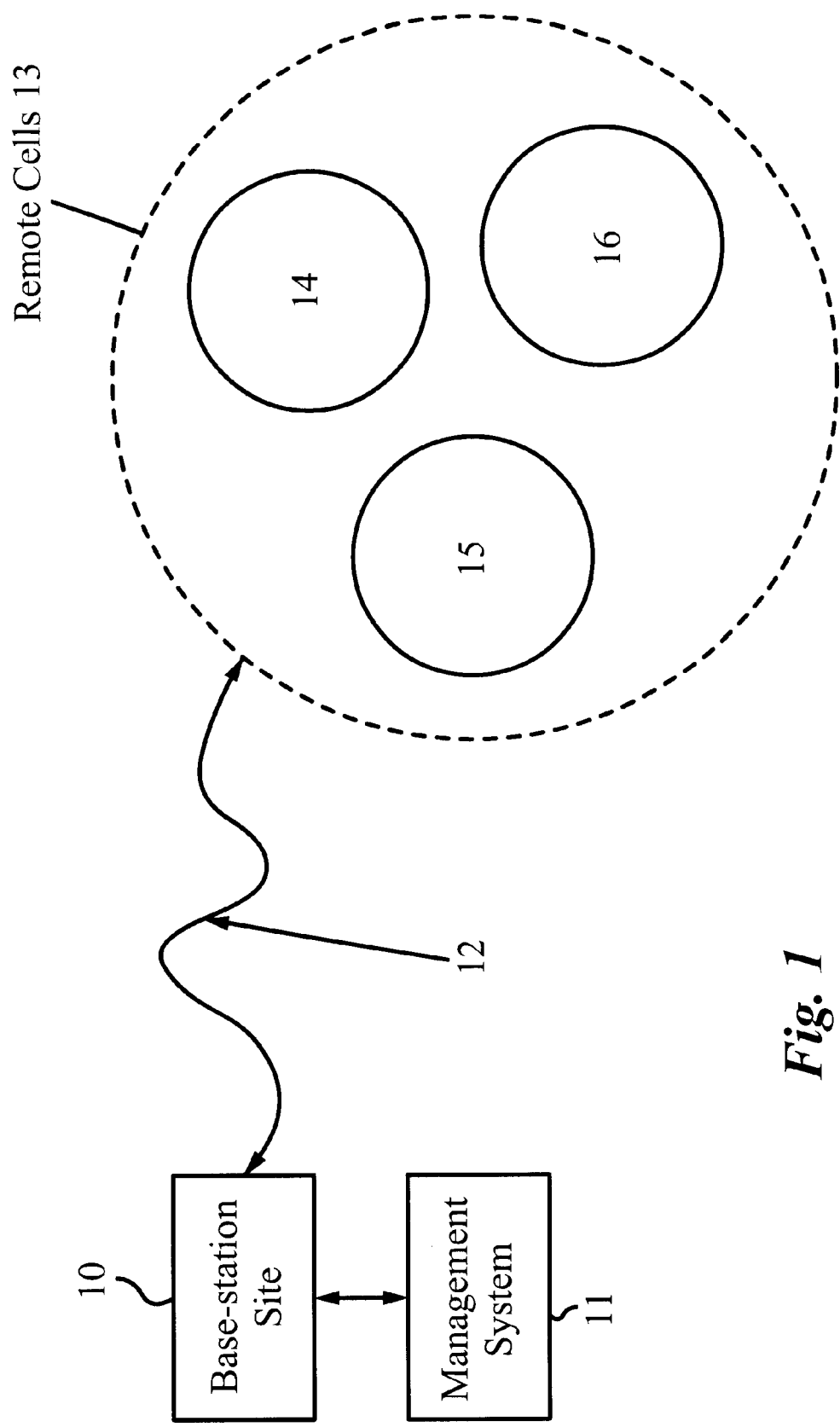
FIG. 1 depicts an exemplary embodiment of a cellular network architecture according to the present invention.

FIG. 1 shows an exemplary embodiment to illustrate the principal concept and the topological structure of a cellular network architecture according to the present invention. A base-station site 10, containing one or more base-station units, is placed at a centralized location. A management system 11 is in communication with the base-station site 10. A cellular-distribution means 12 links the base-station site 10 to a plurality of remote cells 13, where each remote cell is equipped with S directional antennae, providing non-overlapping and thus mutually exclusive coverage areas. It should be noted that the base-station site 10 may be placed at any location that is suitable for a given application, which may or may not physically overlap with any of the cell sites. What is important is that the base-station units are clustered together, as opposed to one base-station per cell structures in the prior art cellular networks. The base-station site may further include means for routing traffic channel resources (e.g., CDMA signals handled by the base-station units), such as an RF router, to and from the remote cells.

In the initial buildout of the cellular network when traffic is relatively light, one CDMA signal containing n CDMA channels is assigned to all S directional antennae in each remote cell. The management system monitors the offered traffic (defined as the time-averaged number of simultaneous on-going calls taking place in each cell) in each of the remote cells within the entire network and inputs the measured offered traffic to an optimization algorithm. As the traffic grows, the offered traffic m in a given cell may approach the number of available CDMA channels n initially assigned to the cell. The management system executes an optimization algorithm to decide the number of CDMA signals to be assigned to each cell, and through allocation of different CDMA signals to different antennae with a cell, sectorizes those cells that are assigned with more than one CDMA signal. The sectorization is physically accomplished through the use of the directional antennae placed in each cell, such that each antenna handles no more than one CDMA signal and each sector is assigned one CDMA signal. For instance, if three CDMA signals are allocated to a cell where three directional antennae reside covering non-overlapping areas of the cell, each directional antenna is assigned one CDMA signal, and the cell is divided into three sectors. This assignment of distinct CDMA signals to different directional antennae provides more traffic channel capacity to the cell, while mitigating the cross-interference among different CDMA signals.

Various optimization algorithms can be implemented in the management system described above. In one exemplary case, the optimization algorithm assigns the number of CDMA signals to each cell (and to sectorize the cell correspondingly) according to the measured offered traffic in each and every remote cell within the entire cellular network. The principle of its operation is as follows: let G be the total number of CDMA signals available from the centralized base-station site, $q_i$ be the offered traffic in cell i, and N be the total number of remote cells in the network. Assume each cell has S sectorization antenna installed. Compute the quantities $k_i$ ($1 \leq i \leq N$) as follows:

$$K_i = \min\left(S, \, int\left[\alpha G q_i \Big/ \sum_{j=1}^{N} q_j\right]\right)$$

where min ( ) denotes the minimum of the quantities contained inside ( ), int[ ] denotes the smallest integer greater than the quantity inside [ ], and the value of the parameter α takes on a value such that the quanitity $$K = \sum_{j=1}^{N} k_j$$

attains its maximum, subject to the condition K≦G. The number of CDMA signals assigned to remote cell i is then equal to $k_i$.

The algorithm described above essentially assigns to each remote cell a fraction of the total number of available CDMA signals, where the fraction is approximately equal to the ratio of the offered traffic in the remote cell to the total offered traffic in all remote cells, subject to the constraints that (a) the number of CDMA signals assigned to each remote cell does not exceed S, the maximum number of sectors into which the remote cell can be sectorized, and (b) each remote cell is assigned at least one CDMA signal.

It should be noted that the above optimization algorithm provides only one exemplary case. Many other optimization algorithms with different optimization constraints and performance metric can also be implemented in the management system. A skilled artisan can devise a suitable optimization algorithm for a given application.

Figure 2:
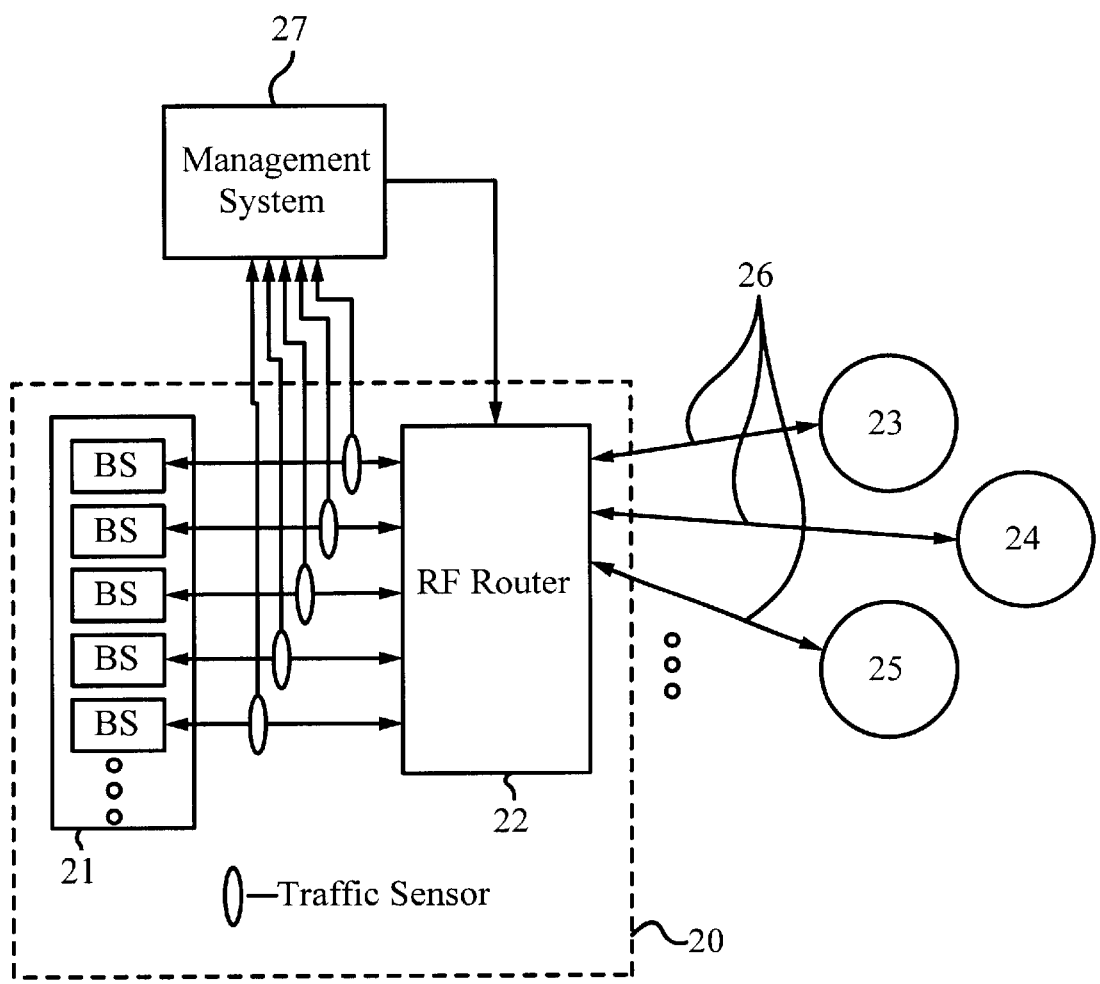
FIG. 2 shows an exemplary embodiment of a cellular network according to the present invention

FIG. 2 illustrates an exemplary embodiment of a cellular network according to the cellular network architecture of the present invention. By way of example, a centralized base-station site 20, including a group of base-station units 21 and an RF router 22, transmits multiple CDMA signals to a plurality of remote cells, such as remote cells 23, 24, 25, via a cellular-distribution link 26. A management system 27 monitors the transmission of CDMA signals between the base-station units 21 and the RF router 22 through a set of traffic sensors, and derives from it the offered traffic in each cell. An optimization algorithm is executed and its results are used to instruct the RF router on how to distribute the CDMA signals from the base-station units to the antennae in the remote cells. The cellular-distribution link 26 can be one or more optical fibers along with corresponding units for making the conversion between cellular signals and optical signals and for multiplexing/de-multiplexing optical signals onto the optical fibers.

Figure 3A:
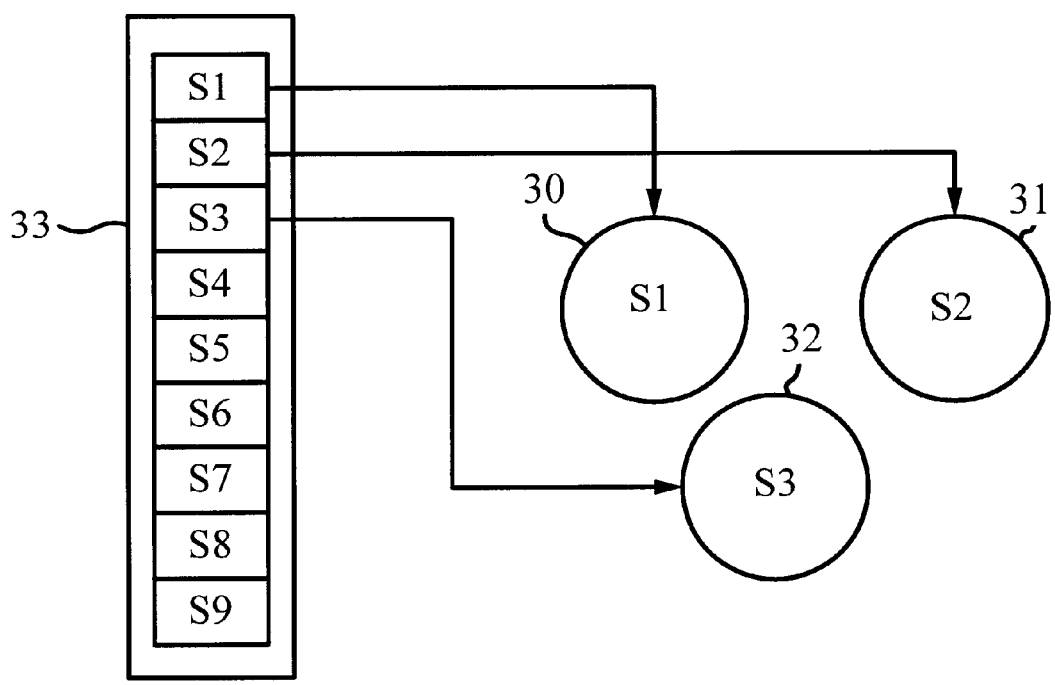
FIGS. 3A–3C illustrate how remote cells are progressively sectorized as the traffic demand grows, according to the present invention.
Figure 3B:
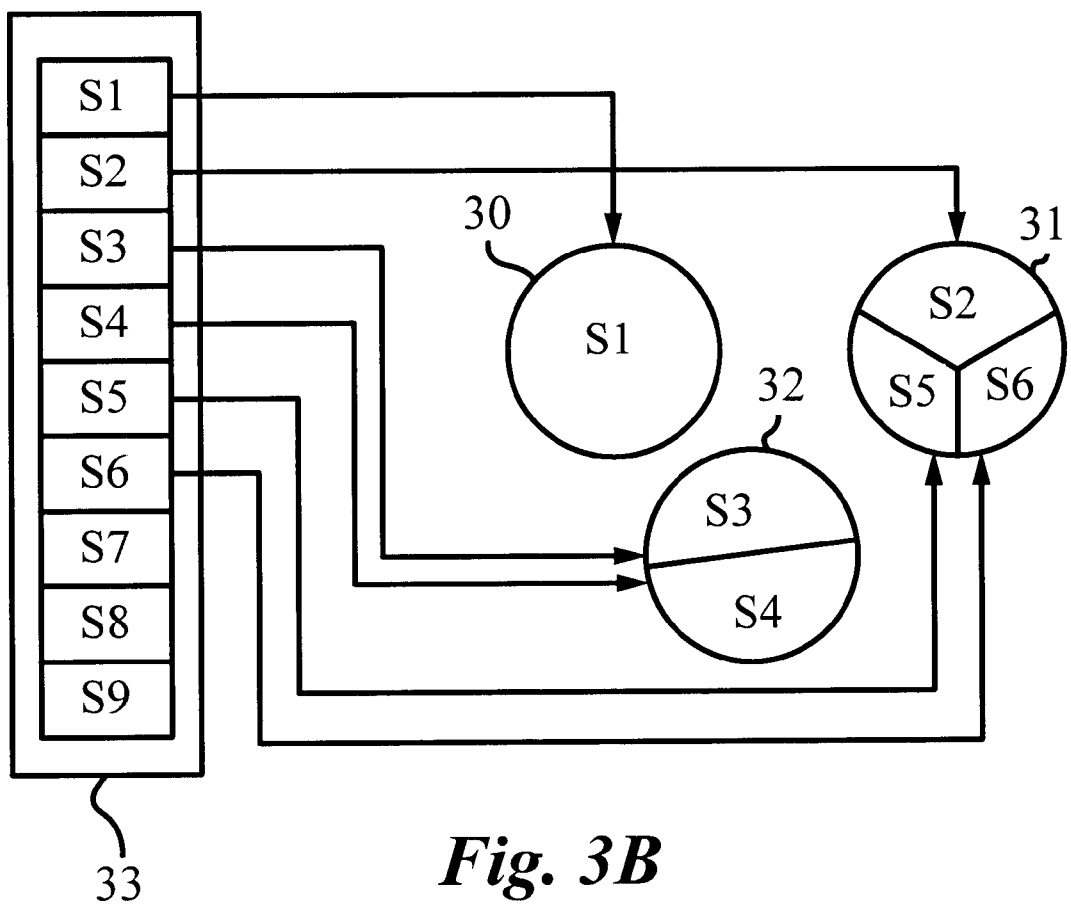
Figure 3C:
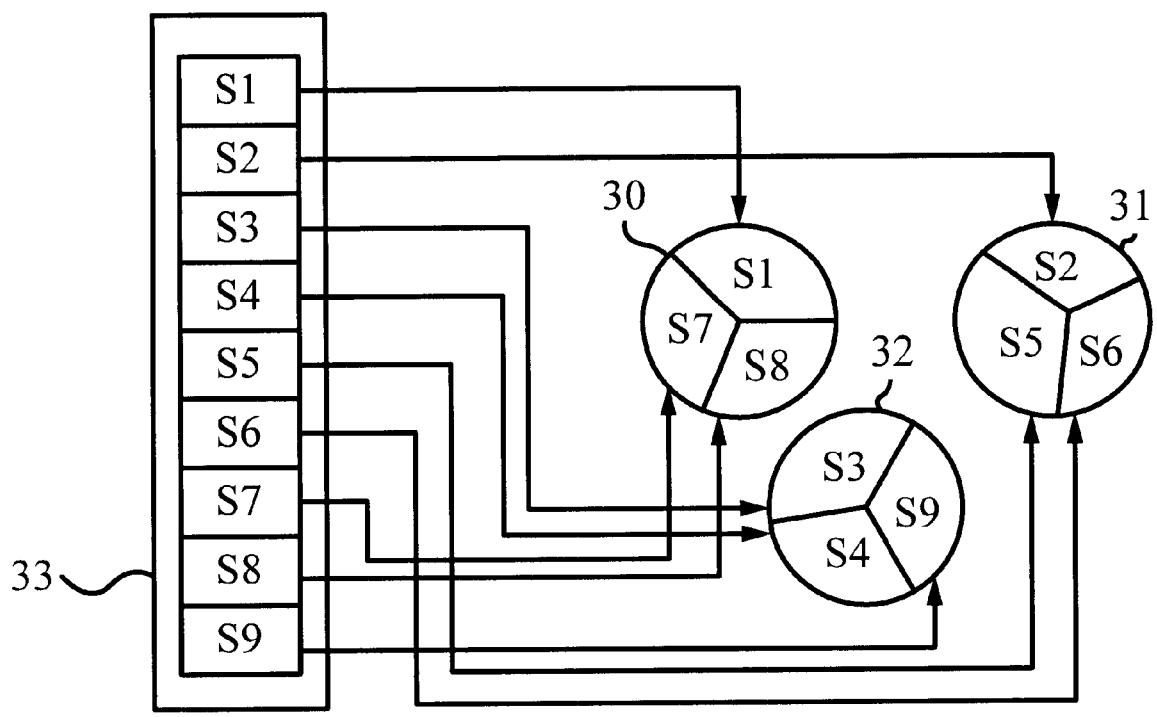

FIGS. 3A–3C illustrate how dynamic sectorization may progressively take place as offered traffic in remote cells increases, according to three exemplary embodiments of the present invention. By way of example and without sacrificing the principal concept of the present invention, three remote cells 30, 31, 32 are shown, each equipped with three directional antennae (i.e., S=3). A centralized base-station site 33 is capable of handling nine CDMA signals, S1–S9, each containing n CDMA channels.

Initially, a single CDMA signal containing n CDMA channels is assigned to each cell, for example, S1 to cell 30, S2 to cell 31, and S3 to cell 32, as shown in FIG. 3A. The respective CDMA signal is fed to all directional antennae in each cell, that is, no sectorization takes place. As the traffic increases in a non-uniform manner, S4 is allocated to cell 32 and assigned to one of three antennae, while the other two antennae in cell 32 continue to handle the original S1, as shown in FIG. 3B. S5 and S6 are allocated to cell 31, such that each of the three antennae in cell 31 now handles a different CDMA signal, also as depicted in FIG. 3B. As the traffic further grows, eventually each cell is split into 3 sectors, where each sector is served by a different CDMA signal, as shown in FIG. 3C.

The cellular-distribution means in the present invention can be one or more optical fibers along with corresponding units for making the conversion between cellular signals and optical signals and for multiplexing/de-multiplexing optical signals to the optical fibers. There are also other ways to distribute cellular signals, including using coaxial cables with or without repeaters, and directional point-to-point or point-to-multipoint microwave links at a high carrier frequency (typically in the 5–60 GHz range).

The management system may be an internal part of the base-station site, or an external system that is able to monitor the cellular traffic flow into or out of the base-station site. The management system is equipped with a monitoring means for measuring offered traffic in each and every remote cell within the cellular network. An example of such a monitoring means is a device that can measure a noise level associated with CDMA traffic, since the noise level on the uplink route increases with the number of CDMA calls.

Figure 4:
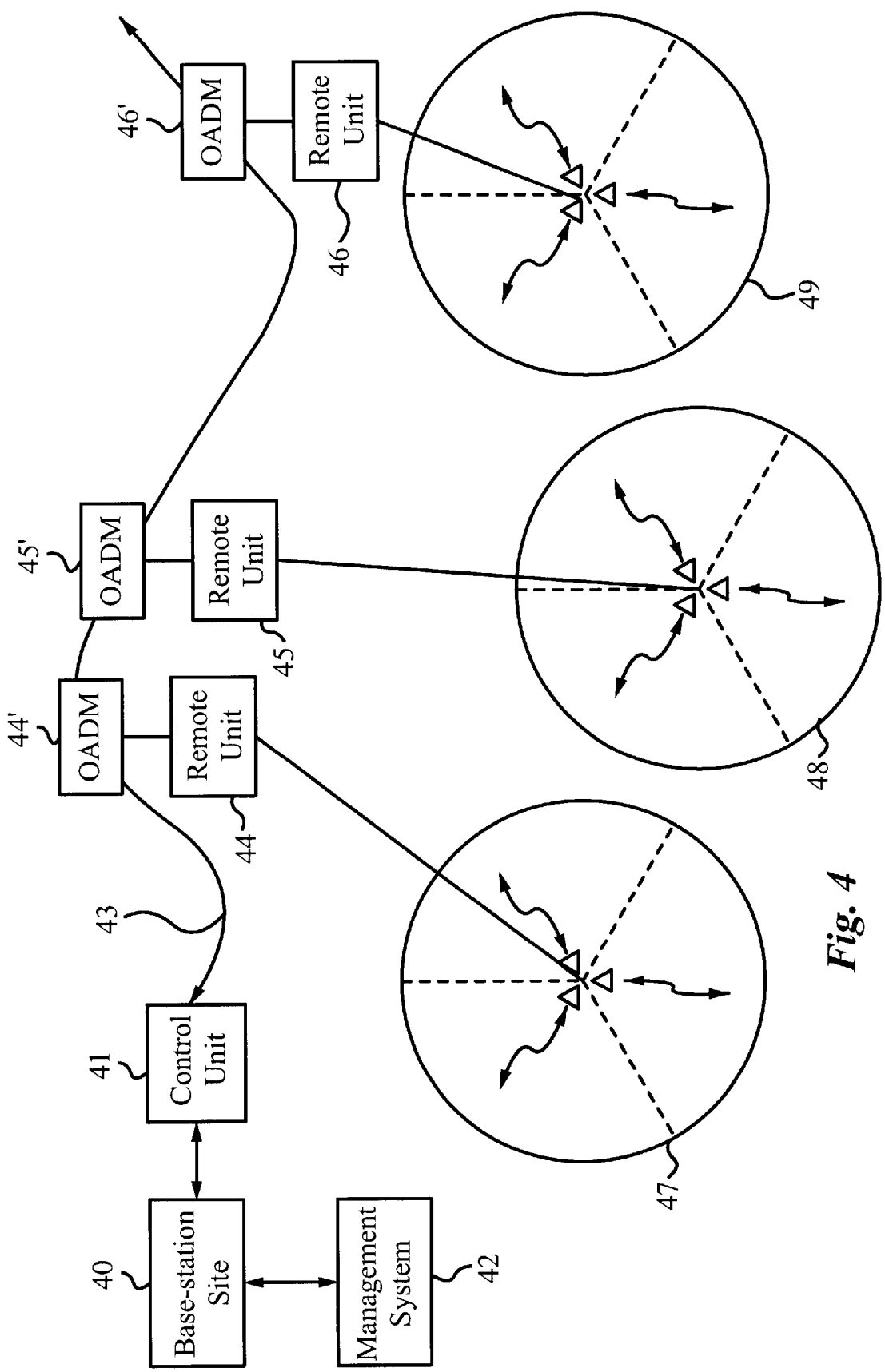
FIG. 4 depicts another exemplary embodiment of a cellular network according to the present invention

FIG. 4 shows an exemplary cellular network according to the present invention. A base-station site 40, including a plurality of base-station units and means for routing traffic channel resources (such as CDMA signals), is placed at a centralized location. The base-station site 40 is connected to a central unit 41 and a management system 42, respectively. A fiber-optic link 43, e.g., one or more optical fibers, connects the central unit 41 to a plurality of remote units through the use of Optical Add-Drop Multiplexers (OADM). By way of example, OADMs 44',45',46' are connected to remote units 44, 45, 46, respectively, which are in turn in communication with three remote cells 47, 48, 49 respectively. Each remote cell is equipped with three directional antennae (i.e., S=3), providing three non-overlapping coverage areas.

The principal operation of the exemplary cellular network in FIG. 4 is as follows. In the downlink route, the base-station site 40 transmits two or more traffic channel groups in the form of CDMA signals to the central unit 41. The central unit 41 converts each CDMA signal to one downlink optical signal with distinct, predetermined downlink optical wavelength such that there is a one-to-one correspondence between each CDMA signal and each downlink optical signal. The conversion from cellular signals (such as CDMA signals) to optical signals is typically accomplished by using the cellular signals to modulate an optical carrier signal at a specified optical wavelength. The central unit then uses wavelength division multiplexing (WDM) to multiplex the resulting downlink optical signals onto the optical fibers 43. OADMs 44',45',46' selectively drop downlink optical signals from the optical fibers to their respective the remote units 44, 45, 46. There is a predetermined, one-to-one correspondence between the selected downlink optical wavelengths and directional antenna in a remote cell. The remote units 44, 45, 46 demultiplex the selected downlink optical signals droped by OADM's 44', 45' and 46' respectively, and restore the original CDMA signals from the de-multiplexed downlink optical signals. The restored CDMA signals are then transmitted to the remote cells.

In the uplink route, uplink cellular signals in the form of CDMA signals are first transmitted to the remote units from antennae in the remote cells. The remote units convert the uplink CDMA signals to one or more uplink optical signals with distinct, predetermined uplink wavelengths which have a one-to-one correspondence with each antenna in each remote cell, and multiplex the uplink optical signals onto the optical fibers through their respective OADM's. Note that for each remote unit, the uplink optical wavelengths it sends back to the optical fibers have a predetermined, one-to-one correspondence with the downlink optical wavelengths it receives from the optical fibers. The central unit in turn de-multiplexes the uplink optical signals delivered by the optical fibers and restores the original uplink cellular signals from the de-mulitiplexed uplink optical signals. The restored uplink cellular signals are subsequently transmitted to the centralized base-station units.

The downlink and uplink operations described above thus complete a full-duplex communication system.

Alternatively, a remote unit and its corresponding OADM described above can be configured as one physical unit, tapping off from an optical fiber. Furthermore, a central unit can be designed as one physical unit handling both uplink and downlink signals, or designed as two physical units handling uplink and downlink cellular signals separately. The same can be said about the remote units.

In general, the central unit and remote units may use any form of WDM technique to multiplex/de-multiplex optical signals onto/from the optical fiber, though dense wavelength division multiplexing (DWDM) is most desirable, for it allows fewer number of optical fibers to be deployed.

The frequencies of CDMA signals are typically in the range of 100 MHz and 3 GHz. The wavelengths of optical signals transmitted on the optical fibers can range from 10,000 nm to 100 nm, and the commonly utilized wavelengths are centered about 850nm, 1330 nm and 1550nm.

Those skilled in the art will recognize that the present invention also enables each cell to de-sectorized in a dynamic manner. For example, if cellular traffic in a particularly cell subsides, the centralized base-stations site may re-assign one or more CDMA signals allocated to the cell to other cells in capacity need.

Although the present invention and its advantages have been described in detail, it should be understood that various changes, substitutions, and alternations can be made herein without departing from the principle and the scope of the invention. Accordingly, the scope of the present invention should be determined by the following claims and their legal equivalents.

What is claimed is:

1. A cellular communications system comprising:
   a) a base-station site containing one or more base-station units at a centralized location;
   b) one or more remote cells;
   c) a distribution means for transmitting traffic channel groups between said base-station site and said one or more remote cells; and
   d) a management system in communication with said base-station site;
   wherein said management system monitors offered traffic, a time-averaged number of simultaneous on-going calls, in each of said one or more remote cells, and dynamically determines an allocation of traffic channel groups to said one or more remote cells, wherein upon allocating a plurality of traffic channel groups to a particular remote cell by said base-station site, each of a number of antennae placed in said particular remote cell is assigned no more than one of said plurality of traffic channel groups, and wherein physical coverage areas provided by each and every of said number of antennae in said particular remote cell are mutually exclusive.

2. The cellular communications system of claim 1 wherein each of said plurality of traffic channel groups is a CDNA signal comprising one or more CDMA channels.

3. The cellular communications system of claim 2 wherein said CDMA signal is characterized by a PN code.

4. The cellular communications system of claim 1 wherein said distribution means comprises one or more optical fibers.

5. The cellular communications system of claim 4 further comprising:
   a) a central unit that converts two or more downlink traffic channel groups transmitted from said base-station site to two or more downlink optical signals with downlink optical wavelengths such that said downlink traffic channel groups and said downlink optical wavelengths are in a one-to-one correspondence, and multiplexes said downlink optical signals onto said one or more optical fibers by use of wavelength division multiplexing (WDM); and
   b) one or more remote units that de-multiplex said downlink optical signals with downlink optical wavelengths delivered by said one or more optical fibers and restore said two or more downlink traffic channel groups from said de-multiplexed downlink optical signals.

6. The cellular communications system of claim 5 wherein said one or more remote units convert uplink cellular signals transmitted from said one or more remote cells to one or more uplink optical signals with uplink optical wavelengths and multiplex said one or more uplink optical signals onto said one or more optical fibers by use of wavelength division multiplexing (WDM), and wherein said central unit de-multiplexes said one or more uplink optical signals from said one or more optical fibers and restores said uplink cellular signals from said de-multiplexed uplink optical signals.

7. The cellular communications system of claim 1 wherein said management system further comprises a monitoring means for measuring said offered traffic.

8. The cellular communications system of claim 7 wherein said traffic channel groups comprise CDMA channels, and wherein said monitoring means comprises a device capable of measuring a noise-level associated with said CDMA channels.

9. The cellular communications system of claim 7 wherein said management system employs an optimization algorithm, and wherein said optimization algorithm uses as input said offered traffic measured by said monitoring means and dynamically determines said allocation of said traffic channel groups to said one or more remote cells.

10. The cellular communications system of claim 9 wherein said traffic channel groups comprise CDMA signals, wherein said optimization algorithm assigns to said particular remote cell a fraction of a total number of CDMA signals available at said base-station site, wherein said fraction is approximately equal to a ratio of said offered traffic in said particular remote cell to a sum of said offered traffic in each and every of said one or more remote cells, subject to constraints that a number of CDMA signals assigned to said particular remote cell does not exceed said number of antennae placed in said particular remote cell, and said particular cell is assigned at least one CDMA signal.

11. The cellular communications system of claim 1 wherein said traffic channel groups are not orthogonal to each other.

12. A method of dynamically allocating traffic capacity in a cellular communications system comprising a centralized base-station site and one or more remote cells, comprising the steps of:
   a) monitoring offered traffic in each of said one or more remote cells within said cellular communications system;
   b) dynamically determining an allocation of traffic channel groups to said one or more remote cells;
   c) transmitting one or more traffic channel groups from said base-station site to a particular remote cell, such that a plurality of traffic channel groups are assigned to said particular remote cell; and
   d) dividing said particular remote cell into mutually exclusive physical sectors, such that each of said sectors is assigned one of said plurality of traffic channel groups.

13. The method of claim 12 wherein said step d) is accomplished by having said particular remote cell equipped with a plurality of directional antennae, wherein physical coverage areas provided by each and every of said plurality of directional antennae are mutually exclusive, and wherein each of said plurality of directional antennae is assigned no more than one of said plurality of traffic channel groups.

14. The method of claim 12 wherein said steps a) and b) are carried out by a management system in communication with said base-station site.

15. The method of claim 14 wherein said management system includes a monitoring means for measuring said offered traffic.

16. The method of claim 14 wherein said management system employs an optimization algorithm, and wherein said optimization algorithm determines said allocation of said traffic channel groups to said each of one or more remote cells.

17. The method of claim 16 wherein said traffic channel groups comprise CDMA signals and said particular remote cell is equipped with a number of antennae, wherein said optimization algorithm assigns to said particular remote cell a fraction of a total number of CDMA signals available at said base-station site, wherein said fraction is approximately equal to a ratio of said offered traffic in said particular remote cell to a sum of said offered traffic in each and every of said one or more remote cells, subject to constraints that a number of CDMA signals assigned to said particular remote cell does not exceed said number of antennae placed in said particular remote cell, and said particular remote cell is assigned at least one CDMA signal.

18. The method of claim 12 wherein said plurality of traffic channel groups are transmitted from said base-station site to said particular remote cell by one or more optical fibers.

19. The method of claim 18 further comprising:
   a) converting two or more downlink traffic channel groups transmitted from said base-station site to two or more downlink optical signals with downlink optical wavelengths such that said downlink traffic channel groups and said downlink optical wavelengths are in a one-to-one correspondence and multiplexing said two or more downlink optical signals to said one or more optical fibers by use of wavelength division multiplexing; and
   b) de-multiplexing said downlink optical signals delivered by said one or more optical fibers and restoring said two or more downlink traffic channel groups from said de-multiplexed downlink optical signals.

20. The method of claim 18 further comprising:
   a) converting uplink cellular signals transmitted from said one or more remote cells to uplink optical signals with uplink optical wavelengths and multiplexing said uplink optical signals onto said one or more optical fibers by use of wavelength division multiplexing;
   b) de-multiplexing said uplink optical signals from said one or more optical fibers and restoring said uplink cellular signals from said de-multiplexed uplink optical signals.

21. A cellular communications system comprising:
   a) a centralized base-station site, containing one or more base-station units;

b) one or more optical fibers;

c) one or more remote cells, each equipped with a plurality of antennae;

d) a central unit connected to said one or more optical fibers, wherein said central unit is in communication with said base-station site;

e) one or more remote units connected to said one or more optical fibers, wherein said one or more remote units are in communication with said one or more remote cells; and f) a management system in communication with said base-station site, wherein said management system supervises dynamic traffic capacity allocation to said one or more remote cells within said cellular communications system.

22. The cellular communications system of claim 21 wherein said management system monitors offered traffic a time-averaged number of simultaneous on-going calls) in each of said one or more remote cells, and determines an allocation of traffic channel groups to said one or more remote cells, wherein upon allocating a plurality of traffic channel groups to a particular remote cell by said base-station site, each of a number of antennae placed in said particular remote cell is assigned no more than one of said plurality of traffic channel groups, and wherein physical coverage areas provided by each and every of said number of antennae in said particular remote cell are mutually exclusive.

23. The cellular communications system of claim 22 wherein said management system further includes a monitoring means for measuring said offered traffic.

24. The cellular communications system of claim 22 wherein said management system employs an optimization algorithm, and wherein said optimization algorithm determines said allocation of said traffic channel groups to said one or more remote cells.

25. The cellular communications system of claim 24 wherein said traffic channel groups comprise CDNA signals, wherein said optimization algorithm assigns to said particular remote cell a fraction of a total number of CDMA signals available at said base-station site, wherein said fraction is approximately equal to a ratio of said offered traffic in said particular remote cell to a sum of said offered traffic in each and every of said one or more remote cells, subject to constraints that a number of CDMA signals assigned to said particular remote cell does not exceed said number of antennae placed in said particular remote cell, and said particular remote cell is assigned at least one of said CDMA signals.

26. The cellular communications system of claim 21 wherein said central unit converts two or more downlink traffic channel groups transmitted from said base-station site to downlink optical signals with downlink optical wavelengths such that said downlink traffic channel groups and said downlink optical wavelengths are in a one-to-one correspondence and multiplexes said downlink optical signals to said one or more optical fibers by use of wavelength division multiplexing, and wherein said one or more remote units de-multiplex said downlink optical signals with downlink optical wavelengths delivered by said one or more optical fibers and restore said two or more downlink traffic channel groups from said demultiplexed downlink optical signals.

27. The cellular communications system of claim 21 wherein one or more remote units convert uplink CDMA signals transmitted from said one or more remote cells to uplink optical signals with uplink optical wavelengths and multiplex said uplink optical signals onto said one or more optical fibers by use of WDM, and wherein said central unit de-multiplexes said uplink optical signals from said one or more optical fibers and restores said uplink CDMA signals from said de-multiplexed uplink optical signals.

* * * * *